Sept. 15, 1959  R. R. DENMAN ET AL  2,903,824
MACHINES FOR PRESS MOLDING HOLLOW GLASSWARE
Filed Nov. 14, 1955  6 Sheets-Sheet 1
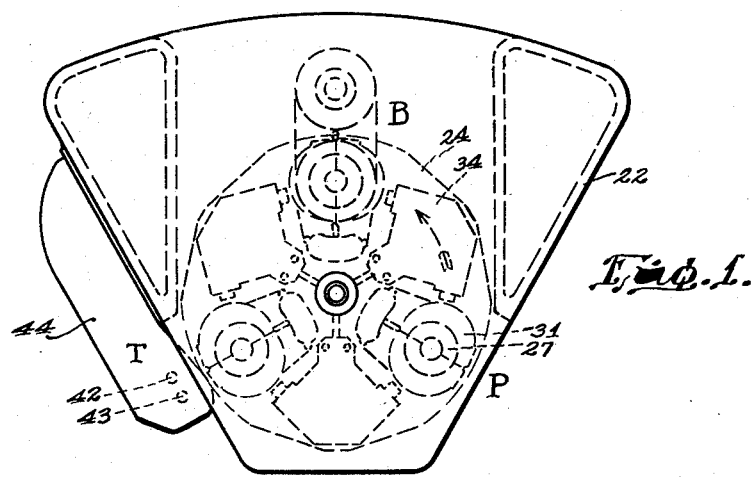
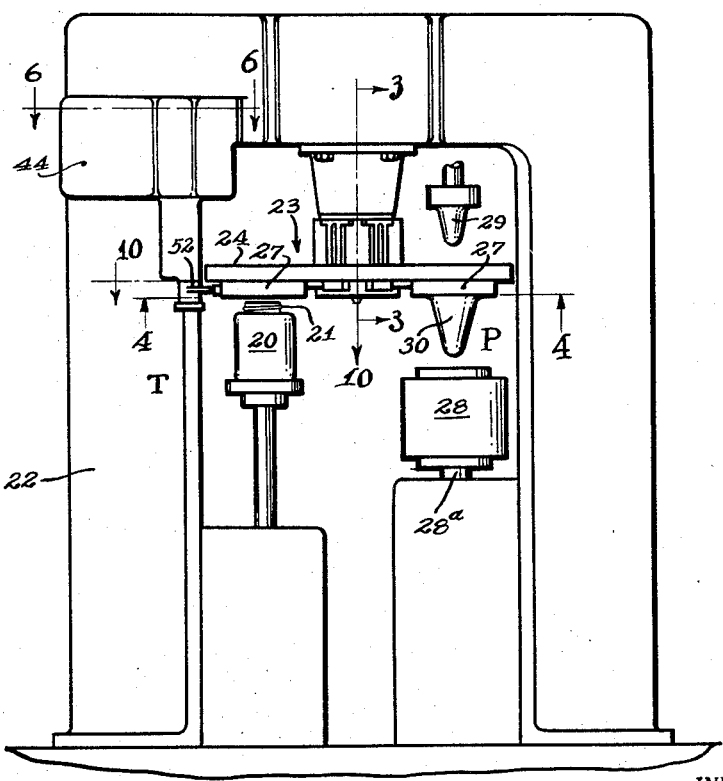
INVENTORS
R.R. DENMAN
U.P. TRUDEAU
BY
ATTORNEYS

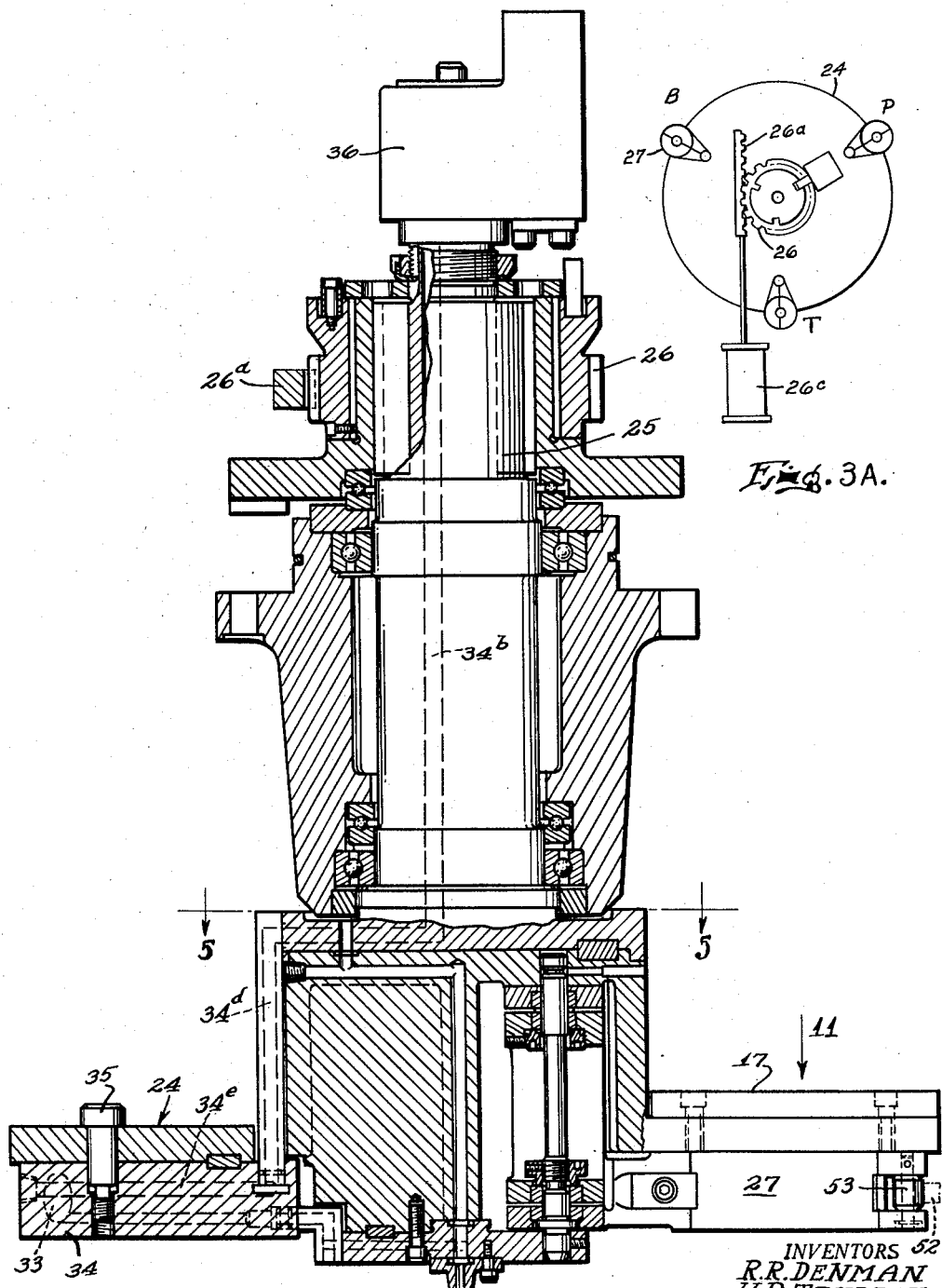

Sept. 15, 1959 R. R. DENMAN ET AL 2,903,824
MACHINES FOR PRESS MOLDING HOLLOW GLASSWARE
Filed Nov. 14, 1955 6 Sheets-Sheet 3

INVENTORS
R. R. DENMAN
U. P. TRUDEAU
BY
Rule and Hoge
ATTORNEYS

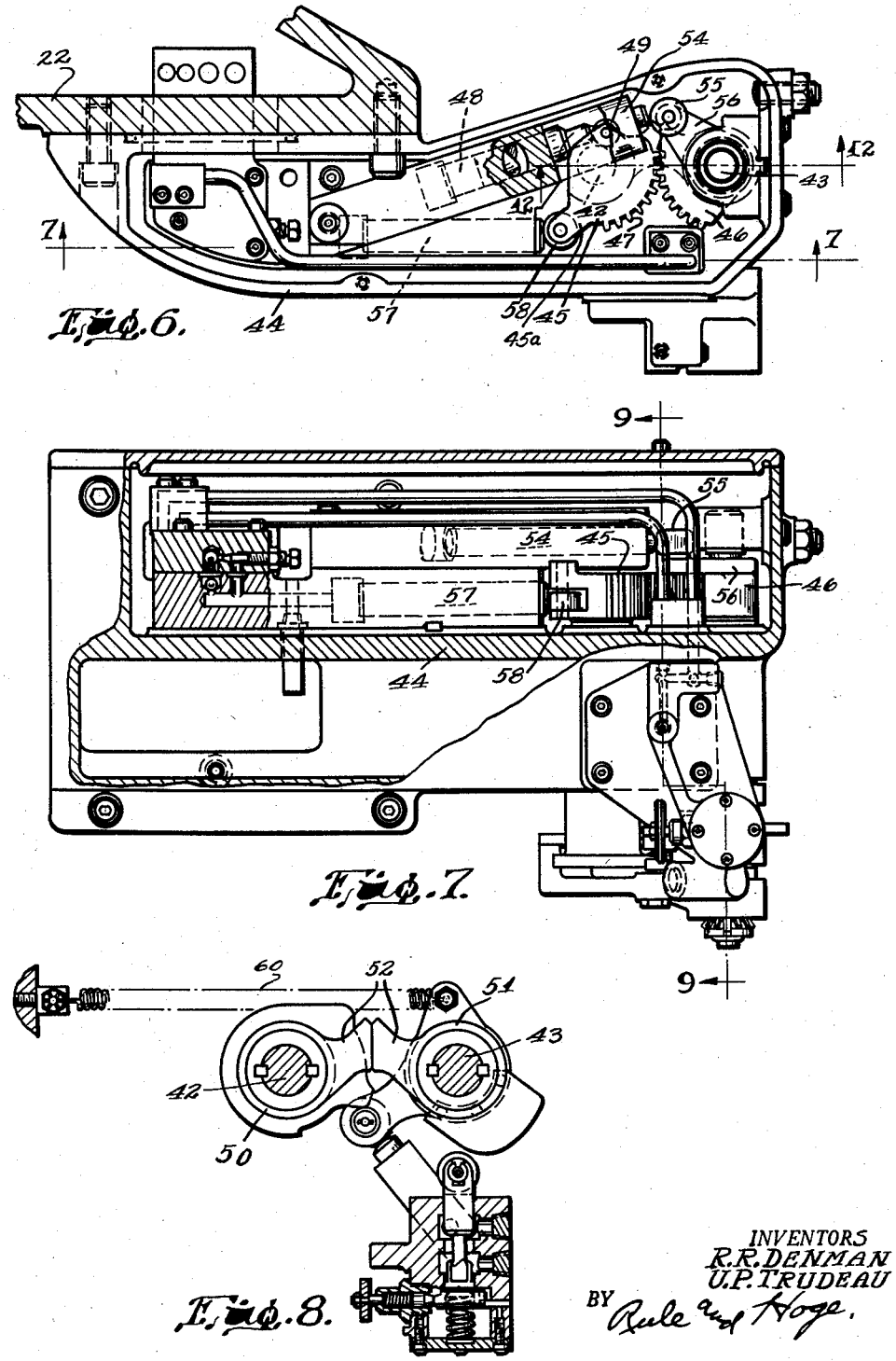

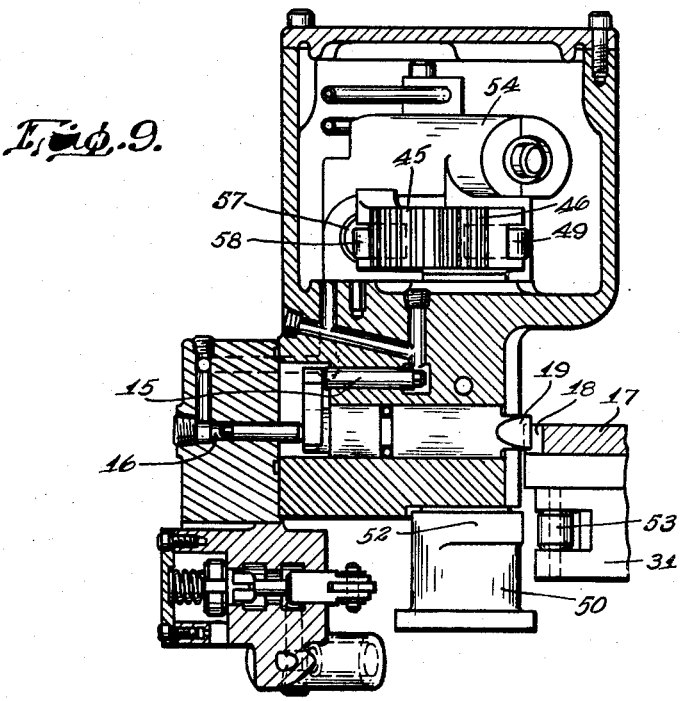
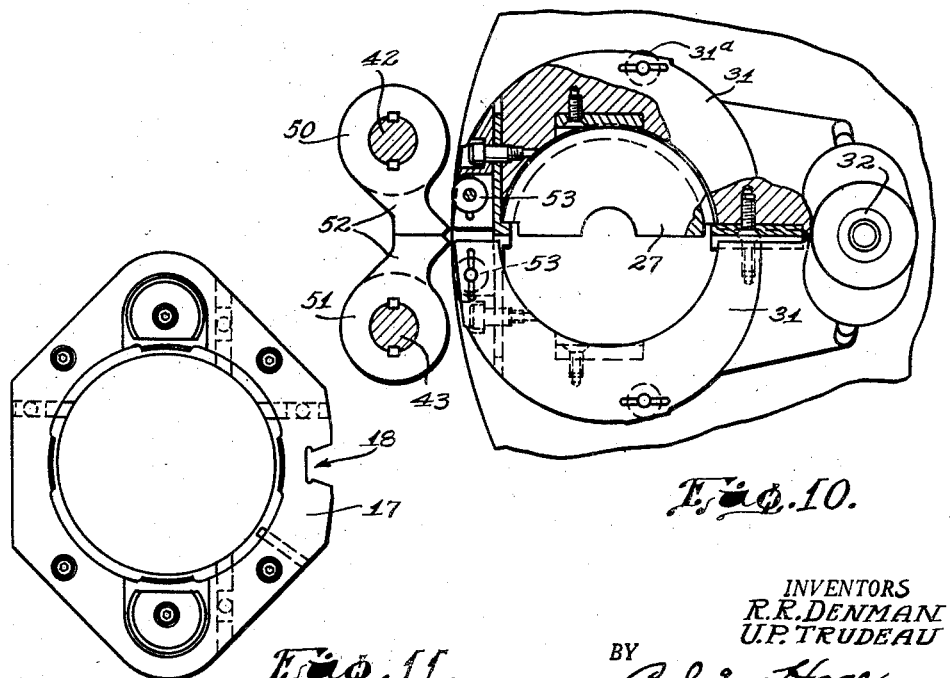

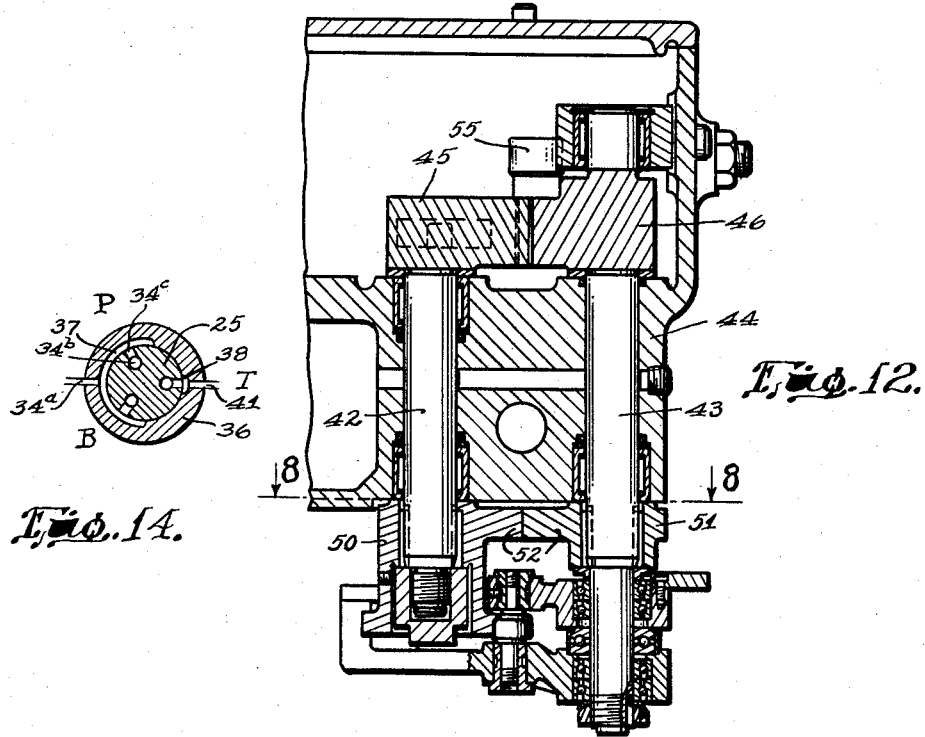
Fig. 12.
Fig. 14.
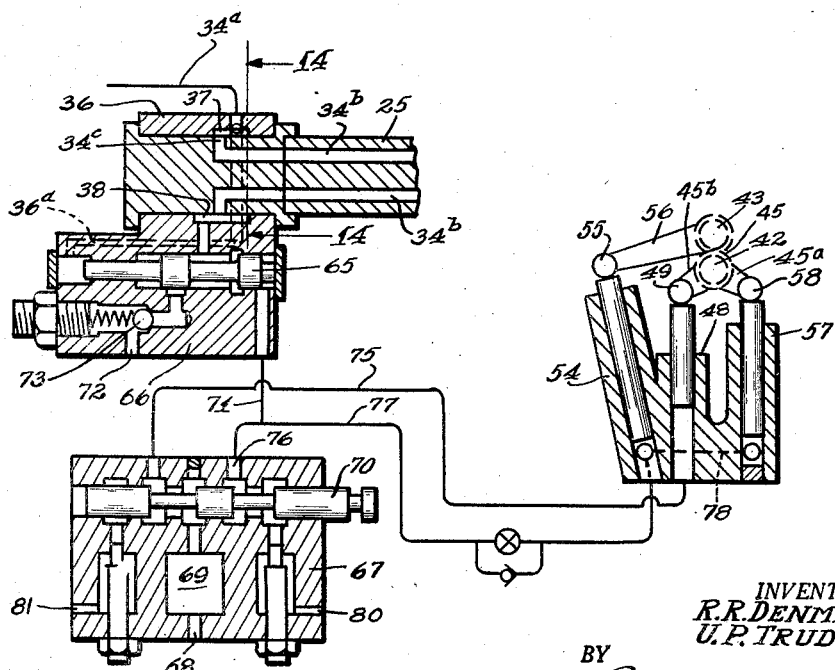
Fig. 13.
INVENTORS
R. R. DENMAN
U. P. TRUDEAU
BY
Rule and Hoge.
ATTORNEYS

United States Patent Office 2,903,824
Patented Sept. 15, 1959

2,903,824

MACHINES FOR PRESS MOLDING HOLLOW GLASSWARE

Robert R. Denman and Urban P. Trudeau, Toledo, Ohio, assignors to Owens-Illinois Glass Company, a corporation of Ohio Application November 14, 1955, Serial No. 546,422

2 Claims. (Cl. 49—38)

Our invention relates to machines for molding glassware and in the preferred form herein illustrated and described the invention is embodied in a machine for molding glass jars or other hollow ware by press molding and blowing operations. The machine as shown is of a type in which the neck portion of the hollow article is molded within a neck ring or mold separate from the body mold. The neck mold consists of partible sections held in closed position by fluid pressure. A charge of molten glass is introduced into a combined neck mold and parison mold. The blank is then given a hollow form and the neck portion of the article molded in the neck ring by a press plunger. The mold carriage is then rotated to bring the parison, while suspended from the neck mold, to the blowing station where the parison is enclosed in a finishing mold and blown to finished form. The next step rotation of the carriage brings the blown article, carried by the neck mold, to a take-out station where the neck mold is opened and the molded article removed.

The neck mold is held closed by high pressure applied thereto by mold clamping fluid actuated pistons during the press forming and blowing operations. An object of the present invention is to provide means for avoiding the necessity of opening the neck ring against such fluid pressure and for this purpose provides means for releasing the pressure while the neck mold is being opened.

Pressure is maintained on the mold clamping cylinders while the neck mold is at the pressing and blowing stations. When the neck mold is brought to the take-out station the high pressure line is interrupted and the clamping mechanism connected through a low pressure line to exhaust during the opening of the neck mold. The neck mold is opened by a fluid actuated piston operating through a pair of rock arms to spread the neck mold arms apart. After removing the molded article the neck mold arms are returned to mold closing position by a mold closing fluid actuated piston which at the same time operates to retract the pistons of the mold opening mechanism.

Other objects of the invention will appear hereinafter.

Referring to the accompanying drawings:

Fig. 1 is a plan view of a press molding machine embodying our invention;

Fig. 2 is an elevational view of the machine, partly diagrammatic;

Fig. 3 is a part sectional view on a larger scale and with parts broken away, the section being at the line 3—3 on Fig. 2;

Fig. 3A is a diagrammatic view showing means for intermittently rotating the mold carriage;

Fig. 6 is a part sectional plan view at the line 6—6 on Fig. 2, with parts broken away, showing the neck mold opening and closing mechanism;

Fig. 7 is a sectional elevation at the line 7—7 on Fig. 6;

Fig. 8 is a cross section at the line 8—8 on Fig. 12;

Fig. 9 is a section at the line 9—9 on Fig. 7;

Fig. 10 is a fragmentary part sectional plan view showing a neck mold and its mounting, the section being at the line 10—10 on Fig. 2;

Fig. 11 is a plan view of a turret locking plate, as indicated by the arrow 11 on Fig. 3;

Fig. 12 is a section at the line 12—12 on Fig. 6;

Fig. 13 is a diagrammatic view of the fluid control system, parts being shown in section; and Fig. 14 is a section at the line 14—14 on Fig. 13.

Figure 4:
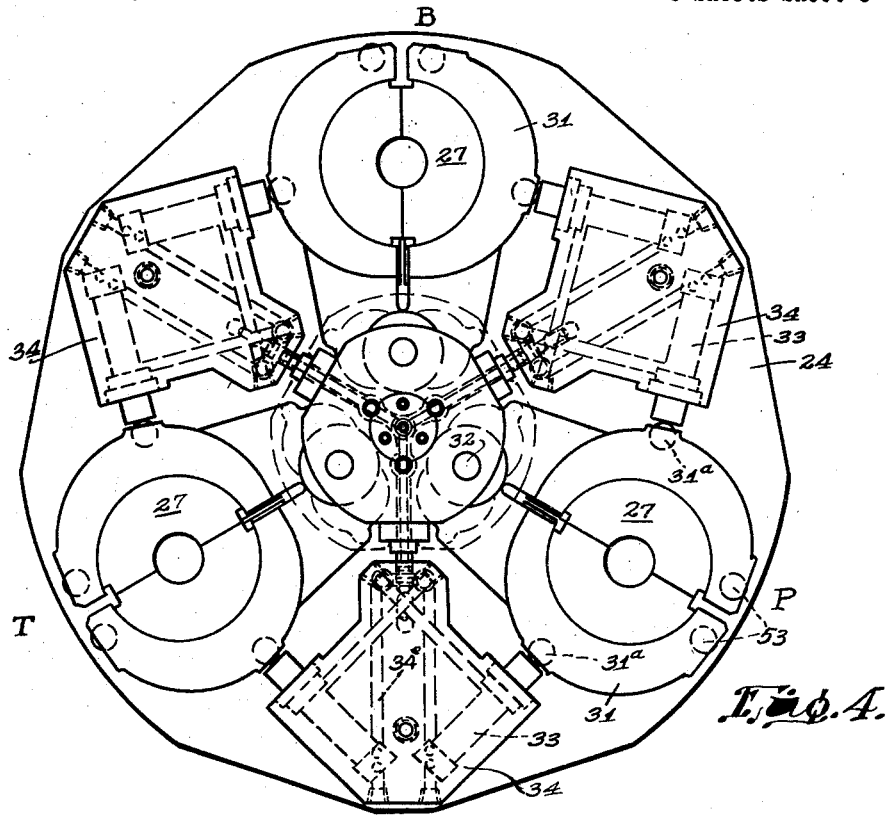
Fig. 4 is a bottom view of the neck molds and associated parts, as indicated by the line 4—4 on Fig. 2.
Figure 5:
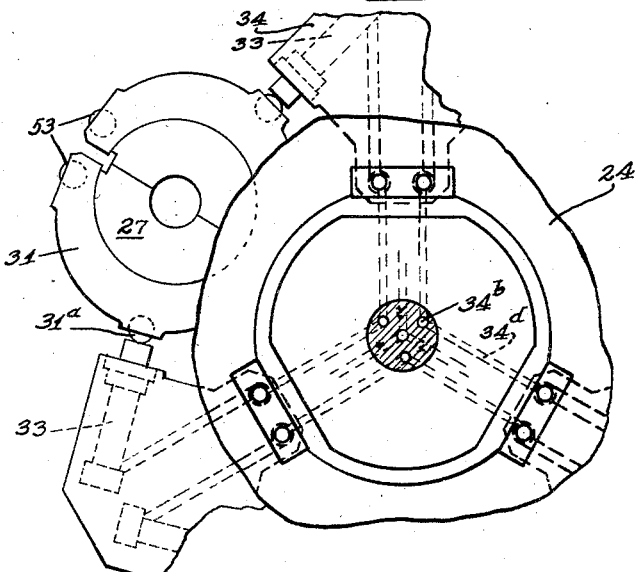
Fig. 5 is a fragmentary view at the line 5—5 on Fig. 3.

The machine as herein shown and described is adapted for molding hollow ware, such as glass jars 20 (Fig. 2) with neck portions 21. The operating parts are mounted on a stationary frame 22. A mold carriage or turret 23 includes a mold table 24 and a vertical shaft 25 (Fig. 3). A gear 26 is connected to the turret shaft. Means for rotating the turret comprises a rack 26ᵃ (Figs. 3 and 3A) in mesh with the gear 26 and power driven by a piston motor 26ᶜ for intermittently rotating the turret step by step, the turret being rotated through 120° at each step rotation. The means for rotating the turret, including the rack 26ᵃ, may be the same as shown, for example, in the copending application of Robert R. Denman, Serial No. 462,230, filed October 14, 1954, now Patent No. 2,832,235, Hydraulic Valve Control for Power Transmission Mechanism. The turret is held stationary after each step rotation by means of a locking detent 19 engaging a notch 18 in a holding plate 17 (Figs. 3, 9, 11). The detent is projected by hydraulic fluid motor or piston 16 and retracted by fluid motor or piston 15.

Neck rings or molds 27, for molding the neck portions 21, are mounted on the underside of the mold table 24.

A parison mold 28 (Fig. 2) is carried on a plunger 28ᵃ of a hydraulically operated press having a stationary mounting at the press molding station P. A plunger comprising a neck pin 29 is positioned above the mold table in register with the parison mold 28. While the mold table is stationary the mold 28 is moved upwardly and the plunger is moved downward for forming a parison 30 from a gob of glass within the blank mold 28. The plunger 29 and mold 28 are then withdrawn leaving the parison suspended from the neck mold 27. After the parison is thus formed the next step rotation of the carriage brings the parison to a blow mold station B (Fig. 1) at which the parison is enclosed in a blow mold and blown to finished form. The blow mold is then opened leaving the article 20 suspended from the neck mold. The next step rotation of the turret brings the blown article to a take-out station T where the neck mold is opened and the jar 20 removed. The mechanism as thus far described for forming the jar 20 is old in the art.

Each neck mold 27 comprises partible mold halves mounted in a pair of arms 31 which swing about a pivot 32 for opening and closing the mold. The mold is held closed by fluid actuated pistons 33 during the pressing and blowing operations. These pistons are mounted in blocks 34 attached to the underside of the mold table by bolts 35 (Fig. 3). The blocks 34 are positioned between and arranged in alternation with the neck molds 27. Each block carries two hydraulic cylinders 33 with pistons engaging contact rolls 31ᵃ on the arms 31. The pistons operate in pairs, being oppositely disposed with respect to each neck mold and operative to move toward each other to bring the sections of the neck mold into closed position.

Operating fluid for the pistons 33 is supplied through a distributing head 36 at the upper end of the turret shaft which is journalled for rotation therein, Figs. 3, 13, and 14. The fluid is supplied through a constant pressure line 34ª, Figs. 13, 14. The rotation of the turret opens the pressure line alternately into arc-shaped channels 37 and 38 within the distributing head 36. Channels 34ᵇ extend vertically through the turret shaft and open through ports 34ᶜ into the channel 37 during a portion of the rotation of the turret. The channels 34ᵇ are extended laterally and downwardly as shown at 34ᵈ (Fig. 3) to the blocks 34 and through channels 34ᵉ (Fig. 4) to the pistons 33. The fluid pressure is thus supplied to the pistons 33 for holding the neck molds closed under high pressure while at the pressing and blowing stations and during their indexing movement from the pressing to the blowing station.

The high pressure line to the clamping pistons 33 is cut off by the rotation of the turret when the port 34ᶜ passes the end of the channel 37. When the port opening 34ᶜ reaches the channel 38, the latter is connected through a reduced pressure line to the exhaust. Referring to Fig. 13, this low pressure line is opened and closed by a spool valve 65 in a valve casing 66. Constant fluid pressure is supplied to a control valve 67 through a port 68 opening into a pressure chamber 69. With the valve piston 70 in the position shown, the fluid pressure is cut off from the valve 65. When a neck mold is brought to the takeout station the valve piston 70 is moved to the left thereby opening the pressure chamber 69 to a line 71 and shifting the valve 65. This opens the low pressure channel 38 to an exhaust port 72. A spring loaded check valve 73 in the line extending from the port 38 to the exhaust port 72 maintains a low pressure in the line 34ᵇ extending to the mold clamping pistons 33 at the take-out station. When the neck mold has been opened as presently described and the blown article removed the valve pistons 70 and 65 are returned to the position shown so that the pressure line to the clamping pistons will be again established when the turret is given another step rotation.

Mechanism for opening the neck molds at the take-out station is mounted within a casing 44 (Figs. 1, 2, 6, and 7) bolted to the machine frame. The mechanism includes a pair of vertical shafts 42 and 43 mounted for rocking movement within the frame 44 and interconnected by segmental gears 45 and 46 fixed respectively to the shafts 42, 43. The gears are formed with intermeshing gear teeth 47. Means providing operating connections between the shafts 42, 43 and the neck mold for opening the latter includes a pair of rock arms 52 formed on hubs 50 and 51 keyed to the shafts 42, 43 (Figs. 10 and 12). When the shafts 42 and 43 are rotated, the arms 52 engage rolls 53 on the neck mold arms and open the neck mold.

Means for rocking the shafts 42, 43 include three fluid motors, namely, an upper motor 54 for opening the neck mold, a lower motor 57, which also serves as a neck mold opening motor, and a lower motor 48 (beneath the motor 54) herein referred to as the closing motor. The piston of the upper motor 54 operates through a contact roll 55 on a rock arm 56 keyed to the shaft 43 to rotate the shaft in a clockwise direction (Fig. 6). This movement transmitted through the rock arms 52 (Fig. 10) operates as above described to open the neck mold.

The motor 57 also functions as a neck mold opening motor. The piston of motor 57 engages a roll 58 on an arm 45ª extending from the gear segment 45 for rotating the latter and opening the neck mold. The motor 48, referred to as a mold closing motor, operates through a roll 49 on an arm 45ᵇ (Fig. 13) on the segment 45 to rotate the latter in a clockwise direction (Fig. 6), thus causing a retraction of the pistons in motors 48 and 54, permitting the neck mold to close. Rotation of the shafts 42 and 43 in the directions for withdrawing the rock arms 52 is limited by the arms being brought together (Fig. 8). A coil spring 60 holds the arms in this position.

Referring to Figs. 13 and 14 it will be apparent that while one of the neck molds is at the take-out station T, the other neck molds are under pressure of the clamping pistons 33 at the pressing and blowing stations P and B respectively. When the turret completes an indexing movement, the parts are in the positions shown in Fig. 14 and by the fluid diagram (Fig. 13) so that pressure is maintained through the channels 34ᵇ leading to the blowing and pressing stations B and P. The channel 34ᵇ extending to the take-out station is shut off from the exhaust 72 by the spool valve 65 which is held in the position shown by pressure through a branch line 36ª. Also at this time the neck mold closing motor 48 is open to pressure supplied through the valve 67 and pressure line 75 so that the neck mold at the take out station T is held closed.

When the turret has been brought to rest with the parts in the positions just referred to the valve piston 70 is shifted to the left (Fig. 13) by a timer cam (not shown). This opens the pressure chamber 69 to line 71 so that the valve spool 65 is moved to the left. This opens the low pressure line extending from the clamping pistons 33 at the take-out station through the low pressure channel 38 to the exhaust port 72, permitting exhaust from the pressure pistons 33 at a low pressure determined by the check valve 73. The shifting of the valve plunger 70 to the left also at the same time cuts off the pressure line 75 extending from chamber 69 to the neck closing cylinder 48 and opens the pressure chamber 69 through a port 76 and pressure line 77 to the neck mold opening motor 54 and through a branch line 78 to the opening motor 57. These neck mold opening motors 57 and 57 accordingly operate rock shafts 42, 43 and open the neck mold at the take out station as before described, and at the same time retract the piston of the mold closing motor 48. The neck mold at the take out station being thus opened the finished article 20 is removed from the machine. The valve piston 70 is then reversed (shifted to the right, Fig. 13) so that the line 71 is cut off from the pressure chamber 69 and the spool valve 65 is reversed and closes the low pressure line to the mold clamping pistons 33 at the take out station T. At the same time, the pressure line 75 is opened so that the piston of motor 48 is projected and thus retracts the mold opening pistons, permitting the neck mold at the take out station to be closed by the clamping pistons 33. The valve 67 is provided with exhaust ports 80 and 81 to permit exhaust from the motors 54, 48 and 57 as the corresponding pistons are retracted.

Modifications may be resorted to within the spirit and scope of our invention.

We claim:

1. A press molding machine comprising a mold carriage mounted for rotation about a vertical axis, neck molds mounted for rotation with the carriage, means for rotating the carriage intermittently step by step and thereby bringing each neck mold to a plurality of stations in succession, the stations including a press molding station, a blowing station and a take-out station, a press plunger at the press molding station, fluid actuated means including a pair of oppositely movable pistons associated with each neck mold and mounted for rotation with the mold carriage to said station, each said pair of pistons operable to hold a neck mold in closed position, a distributing head for controlling flow from a source of fluid under pressure, conduit means rotatable with said carriage connecting said distributor head with each of said pair of pistons, said distributing head having a first passage providing communication between the source of fluid under pressure and the conduits communicating with neck molds removed from the take-out station during travel of the molds from one station to another to hold the associated molds closed during their travel, and a second passage for exhausting fluid from the conduits communicating with that pair of pistons associated with a neck mold positioned at the take-out station, separate fluid actuated pistons disposed at the take-out station, one for opening the neck mold, another for closing the neck mold, and valve means operable in one position while a neck mold is at the take-out station to open said second passage of the distributing head to reduce the pressure on that pair of pistons at the take-out station and concurrently to supply fluid under pressure to the neck mold opening piston, and in another position to supply fluid under pressure to the neck mold closing piston while relieving pressure on the neck opening piston.

2. A glass molding machine as defined in claim 1, said neck molds each including partible sections movable to and from each other for closing and opening the mold, a pair of rock shafts, intermeshing gears connected to the shafts, said means for opening the mold comprising mold opening arms connected to said shafts, said mold closing piston cooperating with one of said arms to move said sections into closed position, said mold opening piston cooperating with another of said arms to move said sections into open position, said closing piston being moved away from its mold closing position by its rock arm when said opening piston moves said sections into open position.

References Cited in the file of this patent

UNITED STATES PATENTS

| | | |
|---|---|---|
| D. 124,656 | Stewart et al. | Jan. 14, 1941 |
| 767,935 | Good | Aug. 16, 1904 |
| 1,979,211 | Rowe | Oct. 30, 1934 |
| 1,995,653 | Rowe | Mar. 26, 1935 |
| 2,205,261 | Winder | June 18, 1940 |
| 2,230,188 | Ferngren | Jan. 28, 1941 |
| 2,316,969 | Mitchel | Apr. 20, 1943 |
| 2,331,687 | Hobson | Oct. 12, 1943 |
| 2,357,501 | Carnahan | Sept. 5, 1944 |
| 2,701,448 | Johnson | Feb. 8, 1955 |
| 2,702,444 | Rowe | Feb. 22, 1955 |